United States Patent [19]
Dickenson et al.

[11] Patent Number: 4,556,956
[45] Date of Patent: Dec. 3, 1985

[54] ADJUSTABLE GAIN CONTROLLER FOR VALVE POSITION CONTROL LOOP AND METHOD FOR REDUCING JITTER

[75] Inventors: Royston J. Dickenson, Scotia; Vijay C. Jaswa, Clifton Park, both of N.Y.

[73] Assignee: General Electric Company, Schenectady, N.Y.

[21] Appl. No.: 533,644

[22] Filed: Sep. 16, 1983

[51] Int. Cl.⁴ .............................................. G05B 13/04
[52] U.S. Cl. .................................... 364/162; 364/157; 364/176; 364/183; 415/17; 60/662
[58] Field of Search .............. 364/157, 162, 176, 183, 364/825; 415/17; 60/662

[56] References Cited

U.S. PATENT DOCUMENTS

| | | | |
|---|---|---|---|
| 3,097,488 | 7/1963 | Eggenberger et al. | 60/73 |
| 3,709,626 | 1/1973 | Eggenberger | 415/17 |
| 4,017,056 | 4/1977 | Schwalenstocker et al. | 251/131 |
| 4,089,494 | 5/1978 | Anderson et al. | 318/628 |
| 4,099,237 | 7/1978 | Zitelli et al. | 364/494 |
| 4,211,931 | 7/1980 | Eichelberger et al. | 290/40 A |
| 4,265,263 | 5/1981 | Hobbs | 364/157 |
| 4,280,060 | 7/1981 | Kure-Jensen et al. | 290/40 R |
| 4,357,803 | 11/1982 | Dickenson | 60/662 |
| 4,368,520 | 1/1983 | Hwang et al. | 364/494 |
| 4,466,054 | 8/1984 | Shigemasa et al. | 364/157 |

Primary Examiner—Jerry Smith
Assistant Examiner—John R. Lastova
Attorney, Agent, or Firm—Paul Checkovich; John F. Ahern

[57] ABSTRACT

An adjustable gain controller for a steam turbine valve position control loop includes an electronic operator, a proportional controller, a derivative controller and an integral controller. A steam flow condition error signal is amplified by the reciprocal of the valve's regulation value. The amplified error signal is supplied to the electronic operator and to the integral controller. The electronic operator includes means for initially selecting a value of A and n and generating a gain factor from a nonlinear gain characteristic function utilizing those values in combination with the valve's regulation value and the normalized error signal. The electronic operator multiplies the amplified error signal by the gain factor and applies the resultant signal to the proportional controller and the derivative controller. The output signals from the proportional, derivative and integral controllers are summed together and that sum is input into an electrohydraulic valve actuator system. The electrohydraulic valve actuator directly positions the steam valve. Hydraulic and mechanical jitter is reduced by adjusting the values of A and n to reduce the jitter in the electrohydraulic valve actuator system.

8 Claims, 10 Drawing Figures

ADJUSTABLE GAIN CONTROLLER FOR VALVE POSITION CONTROL LOOP AND METHOD FOR REDUCING JITTER

BACKGROUND OF THE INVENTION

This invention pertains to valve position control loops in steam turbine control systems, and particularly to an adjustable gain controller as part of the digitized portion of the valve position control loop. A method for reducing the jitter in the control loop is also described herein.

The incorporation of digital components into the control system of a steam turbine is advantageous for many reasons widely known to those of ordinary skill in the art. In the past, some steam turbines have been controlled by analog systems which utilize analog electrical signals, and hydraulic signals to control the mechanical devices. One recognized turbine control system which is completely analog in nature is described in U.S. Pat. No. 3,097,488, issued to Eggenberger et al., and that disclosure is incorporated herein by reference thereto. Generally, the Eggenberger et al., patent describes a series of analog electrohydraulic control loops which interact with each other to regulate steam flow into the turbine and thereby control the speed and output torque of the turbine.

In a number of steam turbine control systems, the basic principles of an analog electrohydraulic control system as described in the Eggenberger et al., patent are utilized in addition to a digital control system. U.S. Pat. No. 3,709,626, issued to Eggenberger discloses a digital/analog electrohydraulic turbine control system. The disclosure in that patent is incorporated herein by reference thereto.

A computer based control system for the turbine-generator plant is described in U.S. Pat. No. 4,280,060, issued to Kure-Jensen et al. and the disclosure of that patent is incorporated herein by reference thereto.

Although the incorporation of computer based, digital control systems into the operation of a steam turbine has many advantages, the valves controlled may be analog valves, and some portions of the control loop may remain analog to interface with those valves. Specifically, while parts of the valve position control loop may be digitized, i.e., capable of handling digital signals therein, the remaining portions may be analog in nature. In particular, the control valve positioning subloop (sometimes referred to herein as the electrohydraulic valve actuator) and the bypass valve positioning subloop are usually completely analog in their operation and structure.

The analog valve positioning subloops include a steam valve which is opened and closed by great mechanical forces applied to its valve stem. The force on a typical bypass steam valve is on the order of 10,000 to 20,000 pounds. These forces are developed by an hydraulic actuator which is mechanically attached to the valve stem. High pressure hydraulic fluid is supplied to and vented from the actuator through a servovalve. The servovalve converts analog electrical signals input thereto into hydraulic signals. Somewhere in the subloop, there may be a non-linear function generator which corrects the analog electrical signal to provide for a linear steam flow through the valve which is well known in the art. The subloop is supplied with an analog electrical signal by the primary valve position control loop. Additionally, a feedback signal from the steam valve is fed to a summer which sums the analog electrical signal from the primary control loop with the feedback signal. The summed output ultimately is applied to the electrical input of the servovalve thereby completing the valve positioning subloop. A better understanding of the valve positioning subloop can be obtained from the aforementioned U.S. Pat. No. 3,097,488.

Since the valve, valve hydraulics, valve position and process sensors are analog in nature, when the valve control loop operates in conjunction with a computer based control system the inputs and outputs of the computer must be converted from analog to digital and digital to analog. As is well known by those skilled in the art, the conversion is accomplished with A to D converters and D to A converters (hereinafter A/D or D/A converters). One of the problems which arises with the partially digitized control system is the inability of the A/D converter to provide a completely accurate digital signal for all analog signals input thereto. These problems relate to the quantization of the analog signal and the sampling time of the A/D converters. The problems are aggravated by the noise inherent in any control loop and particularly in the primary valve positioning control loop.

As is well known in the art, it is common to include within the valve position control loop a gain amplifier which provides for the regulation of the steam valve being controlled. The regulation of the steam valve is the instantaneous percent change in the error signal which would cause the demand for the steam valves to instantaneously change between wide open and closed. For example, if the control system normally recognizes a 0 digital signal for a control signal of zero, and a 4096 digital signal for a maximum control signal and the operators establish a regulation value for that particular valve at five percent, the steam valve would be demanded to go through full stroke when the digital control signal varies instantaneously 205 digital levels from the set point of the control signal. As is well known in the art, the set point for the control signal is a preselected signal established by the turbine operators. The valve position control loop generates an error signal between the set point and the feedback signal from a sensor responding to steam flow conditions. The aforementioned U.S. Pat. No. 3,097,488 clearly explains the regulation of steam valves. A five percent regulation for a bypass steam valve is relatively common in the industry. Also, the valve position control loop must respond to the turbine control system signals relatively quickly. The time in which the bypass steam valve must open is in the range of 2-4 seconds.

As is well recognized in the art, the overall gain of the primary valve position control loop, when a relatively low regulation is established, is relatively high because the gain varies inversely with the regulation value. In other words, if the regulation of the controlled valve is set at five percent, the overall gain of the valve position control loop will be twenty, the reciprocal of the regulation value. Small digital signals, generated either by the turbine control system or by the feedback in the valve position control loop, are amplified twenty times and the amplified signals are applied to the valve positioning subloop which effects the positioning of the valve.

The parameter being controlled, typically steam flowing through the valve, is not substantially influenced by high frequency digital signals even though the signals are amplified twenty times by the valve position control loop. However, the servovalve, the hydraulic system associated with the servovalve, the steam valve actuator, the mechanical connections between the actuator and the steam valve stem, and all other mechanical connections attached to the servovalve and associated hydraulic system experience a pulsing action or jitter due to these amplified digital signals. The jitter or pulsating action may cause premature or shaking wearing of the servovalve, the hydraulic system associated therewith, and/or the valve actuator. A better understanding of the specifics of this problem can be found in the illustrations herein and their corresponding description.

OBJECTS OF THE INVENTION

It is an object of this invention to provide means for and method of reducing the mechanical and hydraulic jitter in the electrohydraulic valve actuator or valve positioning subloop of a steam turbine and associated systems which is caused by the digitized portion of a valve position control loop.

It is a further object of this invention to provide for an adjustable gain controller which cooperates with a conventional PID controller to reduce the overall gain of the position control loop at relatively low error signals yet maintaining the relatively quick response of the control loop for a steam turbine.

It is an additional object of this invention to provide for an adjustable gain controller, as part of the digitized portion of the steam turbine valve position control loop, which is adjusted or fine-tuned to reduce the mechanical and hydraulic jitter in the electrohydraulic valve actuator.

It is another object of this invention to provide for an adjustable gain controller in combination with a computer based control system for a steam turbine which reduces the mechanical and hydraulic jitter in the valve positioning subloop wherein the jitter is caused by the digitized portion of the control loop.

It is a further object of this invention to provide for a method of reducing the mechanical and hydraulic jitter in an electrohydraulic steam turbine valve actuator, which is part of a valve position control loop, by generating a gain factor and multiplying the error signal by the gain factor, monitoring the mechanical and hydraulic jitter, and adjusting certain variables which affect the value of the gain factor to reduce the jitter to an acceptable level yet maintaining the response time of the control loop.

SUMMARY OF THE INVENTION

In a preferred embodiment, an adjustable gain controller is part of the digitized portion of a valve position control loop in combination with a control system for a steam turbine. The regulation of the steam valve is set relatively low thereby establishing a relatively high overall gain for the primary valve position control loop. The control loop responds quickly to an error signal, which is the difference between the actual steam flow condition signal, e.g., actual pressure signal, and the desired steam flow condition signal, e.g., desired pressure signal or the setpoint, and the loop includes an electrohydraulic valve actuator which directly effects the positioning of the valve, and hence, the steam flow through the valve. The error signal is amplified by the reciprocal of the valve's regulation value. The adjustable gain controller includes an electronic operator, an adjustable integral controller, an adjustable derivative controller and an adjustable proportional controller. The amplified error signal is fed into both the integral controller and the electronic operator. The electronic operator includes means for initially selecting a value of A between $-1.0$ and $+1.0$ and a value of n from the group consisting of 0, 1 and 2. The electronic operator generates a gain factor G, which is limited to positive valves, from the relationship expressed by $$G = A + (1-A)(E/REG)^n$$

wherein E is the normalized value of the error signal and REG is the valve's regulation value. The output of the electronic operator is applied to the proportional controller and the derivative controller. The outputs of the integral controller, the proportional controller and the derivative controller are summed together. Means for adjusting both values of A and n is incorporated to reduce the mechanical and hydraulic jitter in the electrohydraulic valve actuator and yet maintain the relatively quick response of the control loop to an error signal. A method of reducing the mechanical and hydraulic jitter in an electrohydraulic valve actuator, as part of a valve position control loop, is also provided for herein.

BRIEF DESCRIPTION OF THE DRAWINGS

The claimed invention is better understood by a review of some of the problems involved in digitizing the valve position control loop. Some of these problems are discussed and illustrated herein along with the illustrations and detailed description of the invention wherein:

DETAILED DESCRIPTION OF THE DRAWINGS

Figure 1:
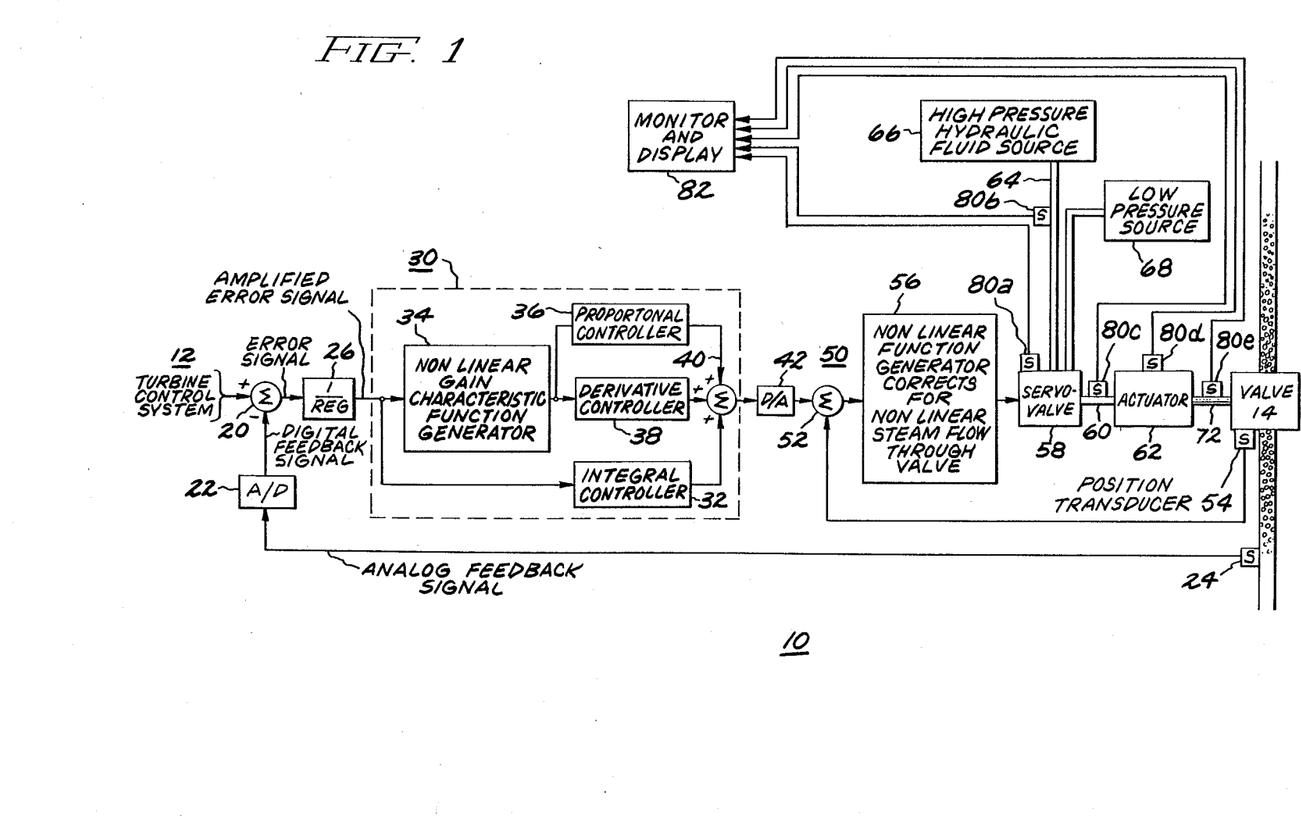
FIG. 1 illustrates control circuit diagram for a valve position control loop which includes the adjustable gain controller and the valve positioning subloop.

FIG. 1 is a control circuit, flow diagram depicting a valve position control loop 10. A computer based turbine control system 12, shown at the left hand side of FIG. 1, provides a digitally formatted signal which is representative of the desired steam flow condition or the desired operating conditions. Valve 14 is illustrated at the right hand side of FIG. 1. Valve 14 controls the flow of fluid, commonly steam, downstream of the valve. Valve 14 could be a steam admission valve associated with the turbine itself rather than a bypass valve as functionally illustrated in FIG. 1. One specific embodiment of the valve position control loop described herein could be incorporated in the bypass system disclosed in U.S. Pat. No. 4,357,803, issued to Dickenson, which disclosure is incorporated herein by reference thereto.

A digitally formatted signal representing the demand operating conditions, is input into a summer 20 from the turbine control system. Those of ordinary skill in the art recognize in the following discussion, the word "signal" may refer to one particular signal or to a number of signals in a time sequence. A feedback signal is subtracted from the desired signal by summer 20 thereby obtaining an error signal. The feedback signal, which is digitally formated by an A/D converter 22, is representative of the actual operating conditions as sensed by a transducer 24. The output of summer 20 is labeled as an "error signal" in FIG. 1.

The error signal is fed into an amplifier 26 which multiplies the signal by the reciprocal of the regulation value of valve 14. The output of amplifier 26 is called the "amplified error signal" herein and is shown as such in FIG. 1. The amplified error signal is applied to an adjustable gain controller which is generally designated 30 by a dashed line in FIG. 1. The amplified error signal is applied to an adjustable integral controller 32 which integrates the signal over a preselected time period.

The amplified error signal is also applied to electronic operator 34 which is labeled in FIG. 1 as the "non linear gain characteristic function generator". Generally, electronic operator 34 multiplies the error signal by a gain factor G which the electronic operator generates therein. The gain factor G is created from the expression $$G = A + (1-A)(E/REG)^n$$

wherein a value of A is initially selected between $-1.0$ and $+1.0$; a value of n is initially selected from the group consisting of 0, 1 and 2; E is the normalized value of the error signal; and the value of REG is the valve's regulation value; the gain factor G is limited to positive values. The interrelationship of gain factor G to the variables within the relationship will be discussed in detail hereinafter.

An adjustable proportional controller 36 receives the electronic operator's output signal, or the resultant signal, as does an adjustable derivative controler 38. Controller 36 multipies the signal by a preselected constant and controller 38 obtains the time derivative of the aforementioned signal with a preselected gain multiplier. As illustrated herein, proportional controller 36 and derivative controller 38 are in parallel. Means for summing the outputs of controller 36, controller 38 and controller 32 is provided by summer 40. The summed output of summer 40 is supplied to a D/A converter 42. It should be noted at this point that the digitized portion of valve position control loop 10 extends from A/D converter 22 through summer 20, amplifier 26, adjustable gain controller 30, summer 40, to D/A converter 42.

The output of D/A converter 42 is applied to a valve positioning subloop 50 which responds primarily to analog electrical signals. Subloop 50 is sometimes referred to herein as an "electrohydraulic valve actuator" and is relatively well known in the art. The aforementioned U.S. Pat. No. 3,097,488, describes in detail valve positioning subloop 50. The analog electrical signal from D/A converter 42 is applied to summer 52. Summer 52 also receives a signal from sensor or transducer 54 which provides a signal representative of the valve's position. A difference signal, from summer 52, is supplied to amplifier 56. Amplifier 56 provides for a nonlinear function generator which corrects for the nonlinear steam flow through valve 14 as is well known in the art.

The electrical signal from amplifier 56 is applied to servovalve 58. Servovalve 58 converts the analog electrical signal into a hydraulic signal and applies that hydraulic pulse or signal through hydraulic lines 60 to actuator 62. Servovalve 58 is a conventional servovalve for large steam turbine systems. Servovalve 58 has a hydraulic fluid system associated therewith which includes hydraulic supply source 66 and line 64 communicating high pressure hydraulic fluid to it and a low pressure sump 68 tied to the servovalve through low pressure hydraulic line 70. Line 60 is hydraulically connected to valve actuator 62 which converts these hydraulic pulses or signals into great mechanical forces which act through mechanical connection 72 on the stem of valve 14.

A plurality of sensors 80a, 80b, 80c, 80d and 80e provide means for sensing the mechanical and hydraulic vibrations or jitter in subloop 50. Sensor 80a, associated with servovalve 58, would measure the mechanical jitter of the servovalve itself or would measure the hydraulic jitter within the workings of the servovalve. It is to be recognized that the positioning and number of the sensors could be altered by one of ordinary skill in the art to measure and monitor the vibration or jitter of the various components within this electrohydraulic valve actuator. Also, of ordinary skill in the art would recognize the need for signal conditioners coupled to each sensor which would filter, amplify and generally interface the output of each sensor with the balance of the monitoring system. In a similar fashion, sensors 24 and 54 could have conditioners associated with their outputs. Means for monitoring the vibratory or jitter signals of the electrohydraulic valve actuator or subloop 50 is illustrated in FIG. 1 by a monitor and display device 82.

Figure 2:
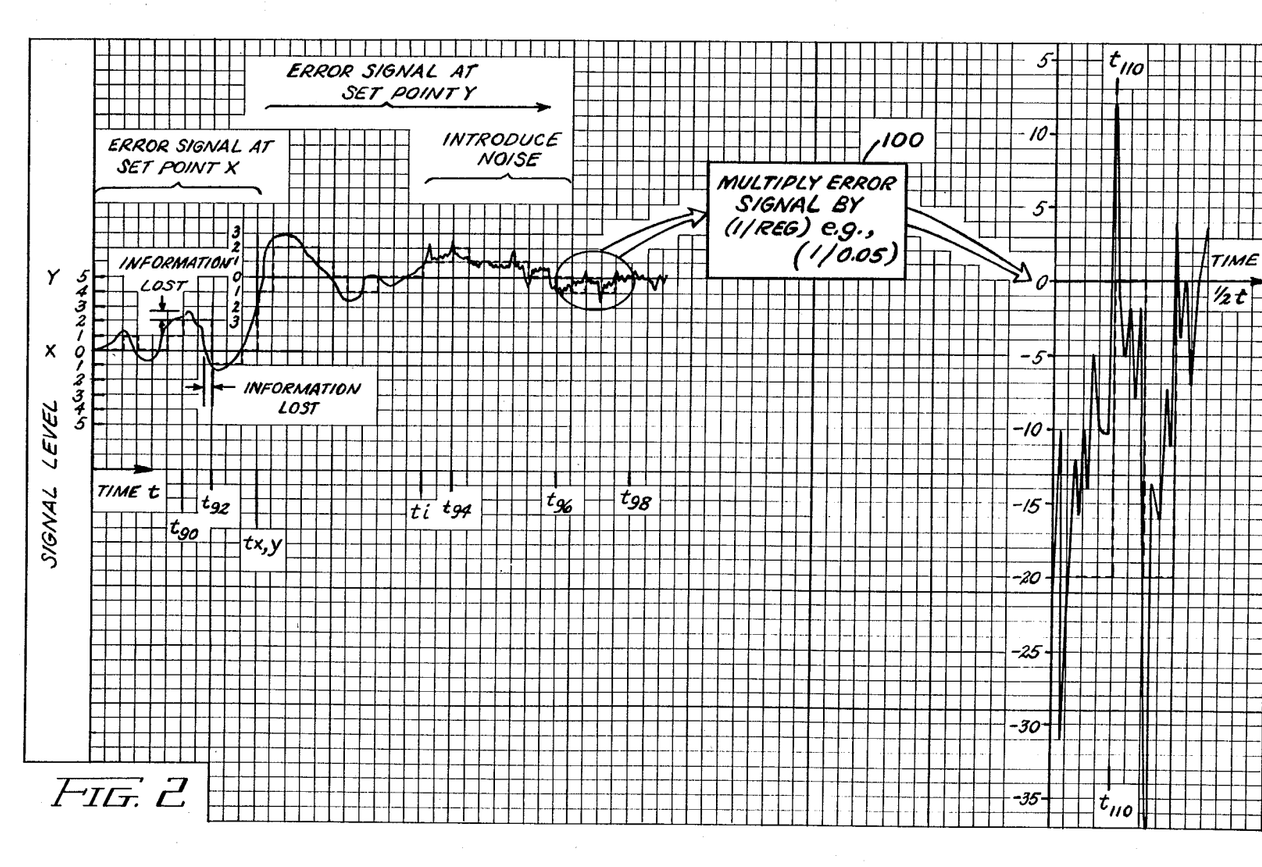
FIG. 2 illustrates graphically some of the problems involved in the conversion of an analog signal into a digital signal and subsequently amplifying that signal by the reciprocal of the valve's regulation value.

The specific operation and consequential benefits of the valve position control loop described herein is better understood by analyzing some of the problems of digitizing an analog signal. FIG. 2 graphically illustrates some of these problems. FIG. 2 has three distinct portions. On the right hand side, a signal level is shown above and below a set point X. The signal level is charted relative to time t. The middle portion of the graph illustrates the signal level at set point Y both before and after the introduction of noise. The left hand side of FIG. 2 graphically illustrates the amplified error signal for a small segment of the middle portion of the figure. Throughout FIG. 2, the solid line represents the analog signal level and the dashed line represents the correponding digital signal. The analog signal is representative of an exemplary analog feedback signal and the digital signals corresponding thereto are superimposed on those signals.

Generally, valve 14 is positioned at a specific set point X. In a digital control system, set point X would have a specific numerical quantity established by turbine control system 12. Even though set point X has been established by the turbine control system, the feedback signal in valve position control loop 10 would produce a varying analog, and a correspondingly varying digital, signal which results from the changing flow of steam through the valve. Therefore, the signals illustrated graphically on the left hand side of FIG. 2 vary above and below set point X. In prior art electrohydraulic control systems, the analog input signal may have caused valve flutter due to the gain in the control loop, however the flutter was reduced in a fashion similar to that disclosed in U.S. Pat. No. 4,211,931, Eichelberger et al., the disclosure of which is incorporated herein by reference thereto.

The partially digitized, valve position control loop presents certain problems with respect to the digital conversion of the analog feedback signal. For example, if the analog signal does not exceed the next predetermined threshold level of the A/D converter, a certain percentage of the analog signal is lost as graphically illustrated at point $t_{90}$ in FIG. 2. In another sense, since the A/D converter samples the analog signal only at predetermined time periods, a sampling rate error is introduced into the control system as noted graphically at point $t_{92}$. Immediately at point $t_{92}$, the analog signal dropped so quickly during one sampling period that the output level of the A/D converter did not change and hence, the digital output lagged the analog signal.

At time $t_{x,y}$, the control system has established at a new set point Y. In this particular example, set point Y is five digital levels above set point X. A new ordinate has been imposed in the middle of the graph in FIG. 2 to illustrate the variance of the signal about set point Y.

It is relatively common for the steam turbine to have noise affecting the valve position control loop. This noise is graphically illustrated at time $t_i$ in FIG. 2. The noise in control loop 10 is caused by many factors well known to those of ordinary skill in the art. A high frequency noise could cause A/D converter 22, in FIG. 1, to change its digital output level if the noise occurred on a signal close to the next threshold level and at the sampling time as illustrated graphically at $t_{94}$. This particular analog noise would be carried through control loop 10 as a digital pulse. The digital reaction to the digitization error, sampling rate error and the noise can result in a high frequency pulsating action or jitter in the balance of the system.

To better understand the operation and some of the advantages of this invention, it is helpful to discuss the system with a particular steam valve and control system in mind. For exemplary purposes herein, steam valve 14 is designated as a bypass valve which allows steam to bypass the intermediate pressure turbine and the low pressure turbine in a turbine-generator unit as disclosed in U.S. Pat. No. 4,357,803, Dickenson. The Dickenson patent is incorporated herein by reference thereto. The control system, as described in Dickenson, could utilize the principles of this invention by replacing the P.I.D. controller identified in that patent with adjustable gain controller 30 as disclosed herein. Of course, Dickenson's control system must be digital in nature as disclosed in that patent.

The conversion of signals from analog to digital could be accomplished by twelve bit A/D converters which are relatively well known. The sampling rate chosen for this partially digitized, bypass valve position control loop can be as high as 100 samples per second or 100 Hertz depending on the magnitude and frequency of the noise. These 12 bit A/D converters convert the analog feedback signal into one of 4096 possible digital levels. To reduce the type errors discussed above, a more sophisticated A/D converter, i.e., a higher bit A/D converter, would provide more digital levels than the 12 bit A/D converter and the sampling rates could be shortened. However, more sophisticated A/D converters and higher sampling rate periods are not commercially feasible at this time nor are these sophisticated electronic devices necessarily compatable with other digital equipment in the turbine-generator plant in general.

In bypass valve control systems, the bypass valve will have a regulation value set relatively low by the operators of the turbine-generator unit and the valve must quickly open or close. A bypass valve is normally opened or closed within 2-4 seconds. A normal regulation for a bypass valve is five percent. Hence, if valve 14 illustrated in FIG. 1 of this invention, has a regulation value set at five percent, the overall gain of valve position control loop 10 would be in the range of 20 due to the amplification of the error signal by the reciprocal of the regulation value.

FIG. 2, graphically illustrates the effects of a gain of 20 on both the analog signal and the digital signal resulting therefrom. A segment of the graph from time $t_{96}$ and extending to time $t_{98}$, is input into an amplifier 100 which multiplies the analog and superimposed digital signal by 20 and the amplified error signal is graphically illustrated along the right hand side of FIG. 2. An ordinate scale is overlaid on the right hand portion of the graph in FIG. 2. As can be easily recognized herein, when the valve position control loop changes in error only in the range of one digital level, that signal is amplified 20 times and becomes 20 digital levels as graphically illustrated as a pulse at $t_{110}$. The coordinate system on the abscissa in the right hand portion of FIG. 2 is one-half time, i.e., $\frac{1}{2}$ t.

As stated earlier, a high frequency pulsating action or jitter would not effect the flow of steam through the valve. However, the pulsating action or jitter would effect the servovalve, its associated hydraulic system, the actuator, and all mechanical connections to those particular items.

Conventional methods of digitally filtering out the typical analog noise noted in steam turbine applications, require fast sample rates for controlling valves in steam turbine units because otherwise the filter would slow down the response of the valve to an unacceptable level. These fast sample rates increase the frequency of pulsating action or jitter which leads to shorter hydraulic component life.

Figure 3A:
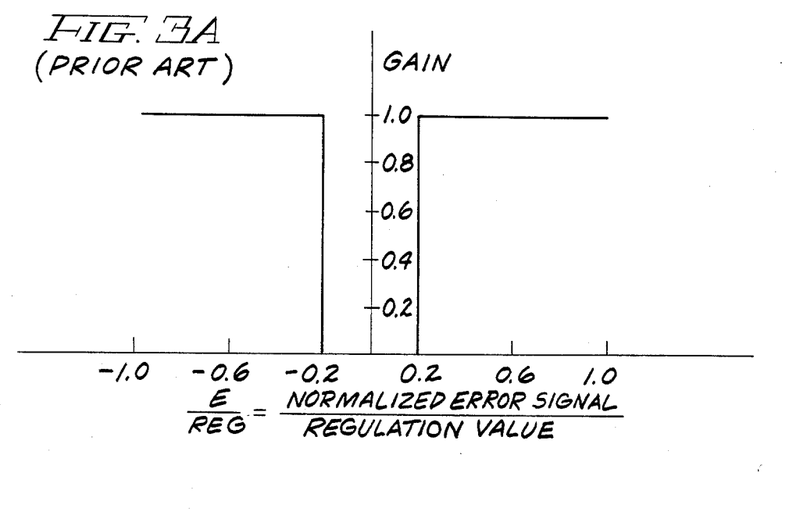
FIGS. 3a and 3b graphically display the gain curve and a normalized output curve (O/REG), respectively, of a prior art device, both curves being a function of the normalized error signal multiplied by the reciprocal of the valve's regulation value (E/REG)
Figure 3B:
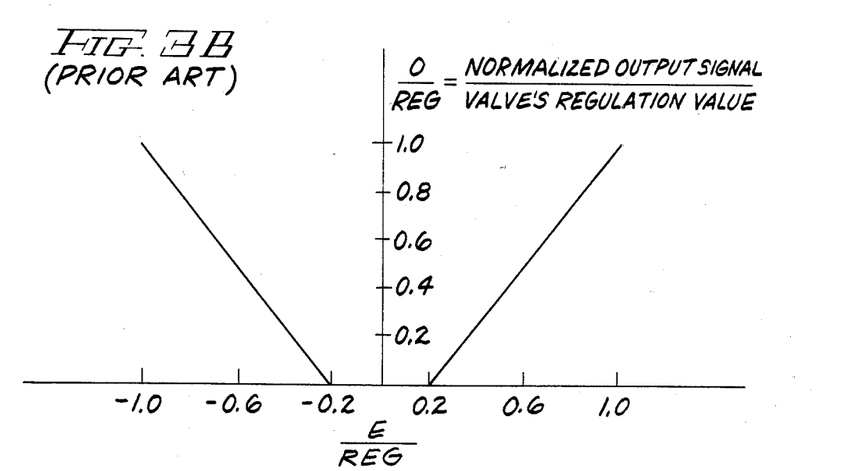

FIGS. 3a and 3b graphically display one type of filter in which signals of a certain percentage are blocked out of the control loop. Specifically, in FIG. 3a, the input signal is a ratio, E/REG, plotted along the abscissa is equal to the normalized error signal divided by the regulation value of the valve. As used in the example herein, the normalized error signal is an error signal which is the difference between the actual steam flow condition signal and the desired steam flow condition signal divided by the total number of signal levels available to control the valve. In the Dickenson patent, actual steam flow signal is a pressure signal as noted upstream of valve 14 and the desired flow signal is a desired pressure signal. For example, if the error signal is 15, resulting from a set point of 3000 minus the actual signal of 2985, the normalized error signal is 0.00366. The normalized signal is the ratio of 15 to 4096, the latter number being the total number of available digital positions or levels in the 12 bit A/D converter cited in the example above. The E/REG ratio in this particular instance would be 0.0732 which corresponds to an error signal of 15 and a five percent regulation value for valve 14.

Prior art devices have suggested if noise is apparent in control loop 10 on the order of 15 digital levels, a filter designed specifically to eliminate that range of noise could be installed in the control loop. FIG. 3a represents the gain curve for such a filter which blocks out noise up to 20% the input signal, of E/REG, or 41 digital levels for a 4096 position valve, regulated at 5%. The filter would not pass any noise which does not exceed 41 digital levels above or below the particular set point for the valve, but would pass all other levels.

FIG. 3b is a conventional input/output graph of the aforementioned filter wherein the normalized error signal over the valve's regulation value (E/REG) is plotted on the abscissa and the normalized output level over the valve's regulation value is plotted on the ordinate (O/REG). This filter may not be acceptable because it may not respond to low level signals where a response should be maintained to operate the turbine within certain safety parameters. Those of ordinary skill in the art could easily obtain a device which provides the "dead band" filter as graphically depicted in FIGS. 3a and 3b.

Returning to the present invention, electronic operator 34, shown in FIG. 1, multiplies the amplified error signal by a gain factor G. The gain factor is generated by the electronic operator and is expressed by the relationship $$G = A + (1-A)(E/REG)^n$$

where G is limited to positive values. This relationship is a nonlinear gain characteristic function and provides small gain factors G for operation of valve 14 when small error signals are applied to electronic operator 34. These small error signals normally correspond to changes in steam pressure. With positive values of A, the overall control loop response is slower with small errors than with large errors but the valve is moved in the proper direction by the small signal. Also, the nonlinear gain characteristic function provides for the large gain factors G for the operation of the valve when large error signals are noted. In other words, for small errors it is desirable to reduce the gain in the control loop yet for large errors the gain of the loop should be large, so that the overall response of the valve should remain relatively quick.

The values of A and n are variable or adjustable to customize or fine tune the particular valve position control loop installed in a specific steam turbine. It is recognized in the art that the amplitude and frequency of high frequency pulsation or jitter and system noise varies for each particular application and each particular steam turbine. Also, it is recognized that the amount of mechanical vibration or jitter which can be absorbed or tolerated by subloop 50 varies with each turbine plant. If the electrohydraulic valve actuator system or subloop 50 is susceptible to jitter or deteriorates rapidly with high frequency jitter, the values of A and n in the nonlinear gain characteristic function may be adjusted to limit a significant amount of noise which affects the subloop.

Of course, a balance must be struck between the reduction or the minimization of high frequency jitter in the electrohydraulic valve actuator system and the performance of valve 14. One of the features of the nonlinear gain characteristic function is that A and n may be fine tuned, thereby allowing the operator of the steam turbine to balance these two competing aspects of the system, i.e., an acceptable performance versus equipment life of the electrohydraulic valve actuator. Also, the jitter or vibrations within the electrohydraulic valve actuator, or subloop 50 in FIG. 1, may not be readily apparent to the operator of the steam turbine during the time he is monitoring that condition. For example, the amplitude of the digital noise or jitter may be small yet its frequency may be rather high. In such a case, the electrohydraulic valve actuator may deteriorate over a number of months. At this later point in time, the nonlinear gain characteristic function can be altered within the parameters described herein to reduce this jitter to acceptable levels commensurate with the expected life of the equipment and yet have the control loop respond to error signals by establishing the desired steam flow condition within an acceptable period of time.

It should be recognized that although FIG. 1 illustrates a monitor and display 82 cooperating with a plurality of sensors 80a, 80b, 80c, 80d and 80e, the monitoring system need not be as detailed as described herein. It is possible that the operators of the steam turbine could place their hands on servovalve 58, its associated hydraulic system, or any other portion of the electrohydraulic valve actuator, or subloop 50 herein, to determine whether that system is experiencing an unacceptable amount of jitter. In contrast, vibrational sensors could be placed on the various components of the electrohydraulic valve actuator system and electrical signals derived therefrom could be fed into a monitor and display system as illustrated in FIG. 1. In another sense, a single vibrational sensor could be utilized with this invention and that sensor could be moved periodically to determine the amount of jitter in the electrohydraulic valve actuator or subloop 50 herein. For purposes of this invention, it does not matter whether a sophisticated electronic system is utilized or a simple sensory analysis provides means for monitoring the jitter.

FIGS. 4a, 4b, 5a, and 5b graphically illustrate the gain curve and input/output curve for the nonlinear gain characteristic function with various values of A and n.

Figure 4A:
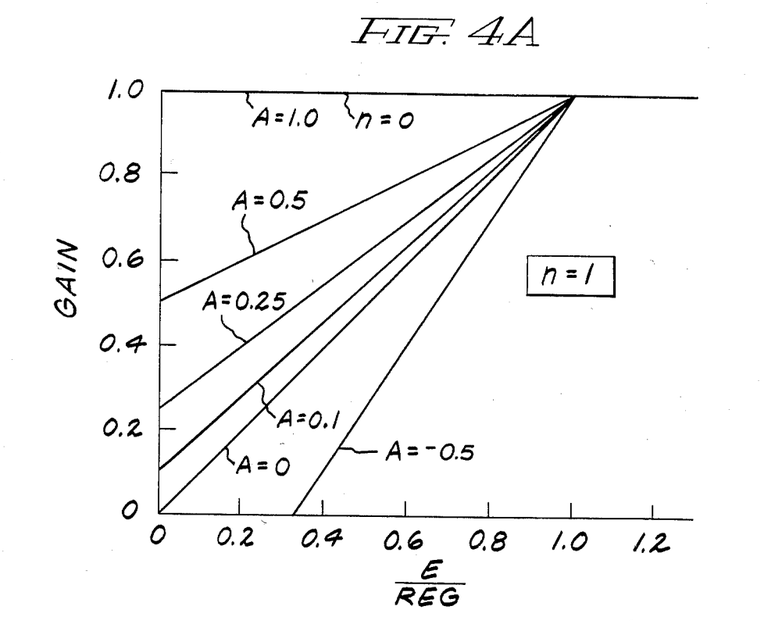
FIGS. 4a and 4b illustrate graphically the gain curves and the input versus output curve (E/REG vs. O/REG) of the non-linear gain characteristic function, wherein $n=1$ and several values of A between $-0.5$ and $+1.0$ have been plotted.

FIG. 4a, the gain curve when n=1, plots along its abscissa E/REG which is equal to the normalized error signal divided by the valve's regulation value. The ordinate of that graph displays the gain or the multiplier which is applied by electronic operator 34 to the amplified error signal in the control loop 10. Initially, it should be noted that when n equals 0, or A equals 1.0 the gain factor equals 1.0 and all amplified error signals pass unaffected through electronic operator 34. As can be deduced from the graph in FIG. 4a, values of A between 0 and −1.0 provide a type of dead band filter. This dead band filter is slightly similar in its operation to the prior art devices discussed above in that a preselected percentage of error signals are filtered out of the control loop. The difference between the prior art and the invention is that signals above that threshold are treated differently as delineated hereinafter. The use of deadband filters within a control loop causes limit cycles in the controller output with the amplitude of these limit cycles being directly proportional to the width of the deadband.

In the invention herein, when A has values between 0 and +1.0, the response to all errors will be positive and enables the system to prevent "soft" or drifting output due to the small errors. However, it should be noted that the nonlinear gain characteristic function generator described herein is adjustable to allow the steam turbine operator to change the values of A and n to fine tune each particular valve position control loop. The fine tuning may include the imposition of some type of deadband filter in the control loop.

Figure 4B:
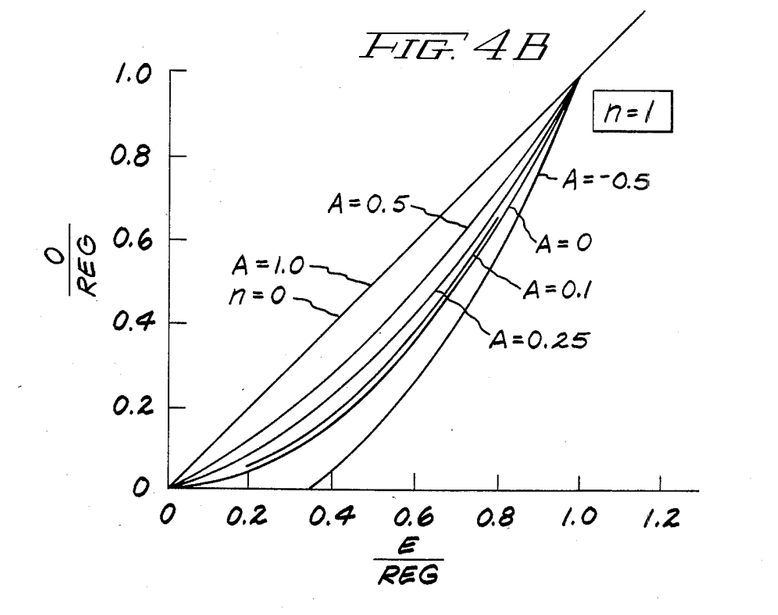

FIG. 4b graphically illustrates the input/output curves for the nonlinear gain characteristic function when n=1 and A equals selected values between −0.5 and +1.0. Although the graphs illustrated in FIGS. 4a, 4b, 5a, 5b and 6, show preselected values of A only between −0.5 and +1.0, it is to be understood that A may be set at any value between −1.0 and +1.0.

Figure 5A:
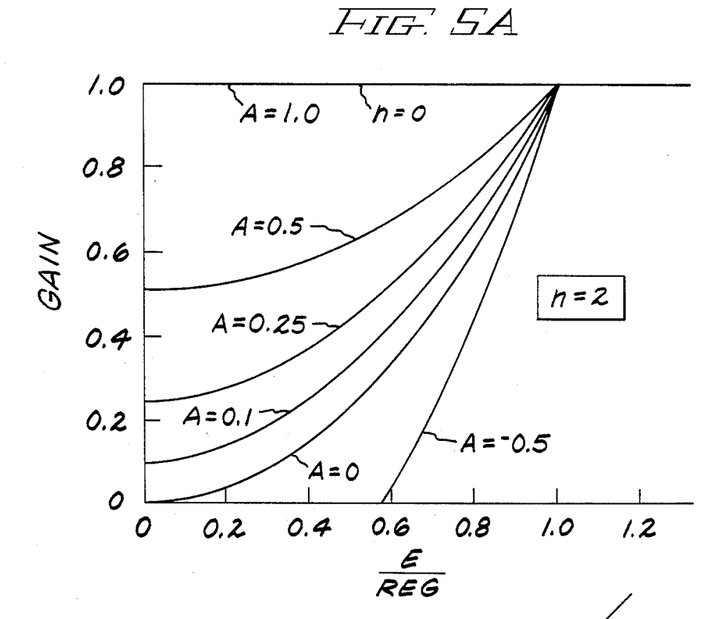
FIGS. 5a and 5b illustrates graphically the gain curve and the input versus output curve of the non-linear gain characteristic function wherein $n=2$ and A varies selectively between $-0.5$ and $+1.0$.

FIG. 5a illustrates the gain curve for the nonlinear gain characteristic function when n=2. A visual comparison of the gain curves when n=2 and n=1 shows that when n=2, the gain factor for a particular error percentage signal is not as high as when n=1 also the slope of the curve with small errors is more gradual. Hence, when n=1 the control loop responds slightly faster to all error signals supplied thereto and the response gets quicker as the error varies around zero error. Hence, when n=2, the system compensates more for high frequency jitter at low errors, while trading off for the jitter at high errors experienced in a major transient.

Figure 5B:
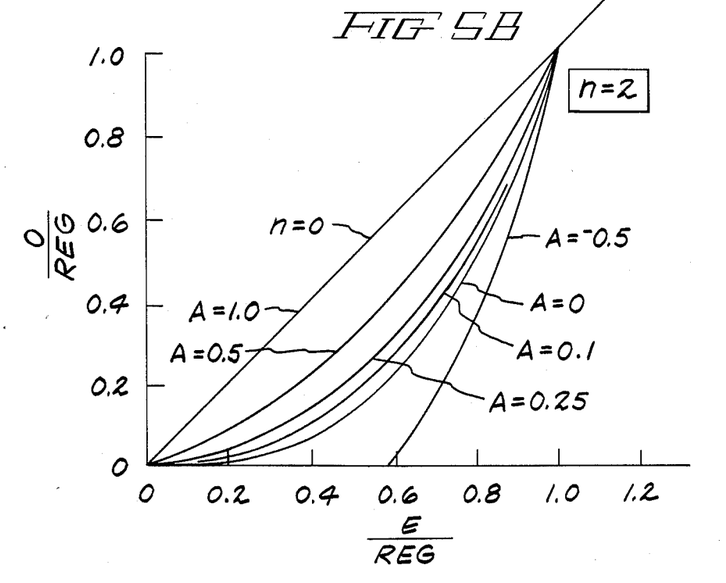

FIG. 5b illustrates the input/output curves for the nonlinear gain characteristic function when n=2 and utilizes substantially the same coordinate system as illustrated FIG. 4b.

It is well recognized in the art that the curves illustrated in FIGS. 4a, 4b, 5a, and 5b would have a complimentary curves, 90° displaced from those shown, when the error signal is negative in nature.

Figure 6:
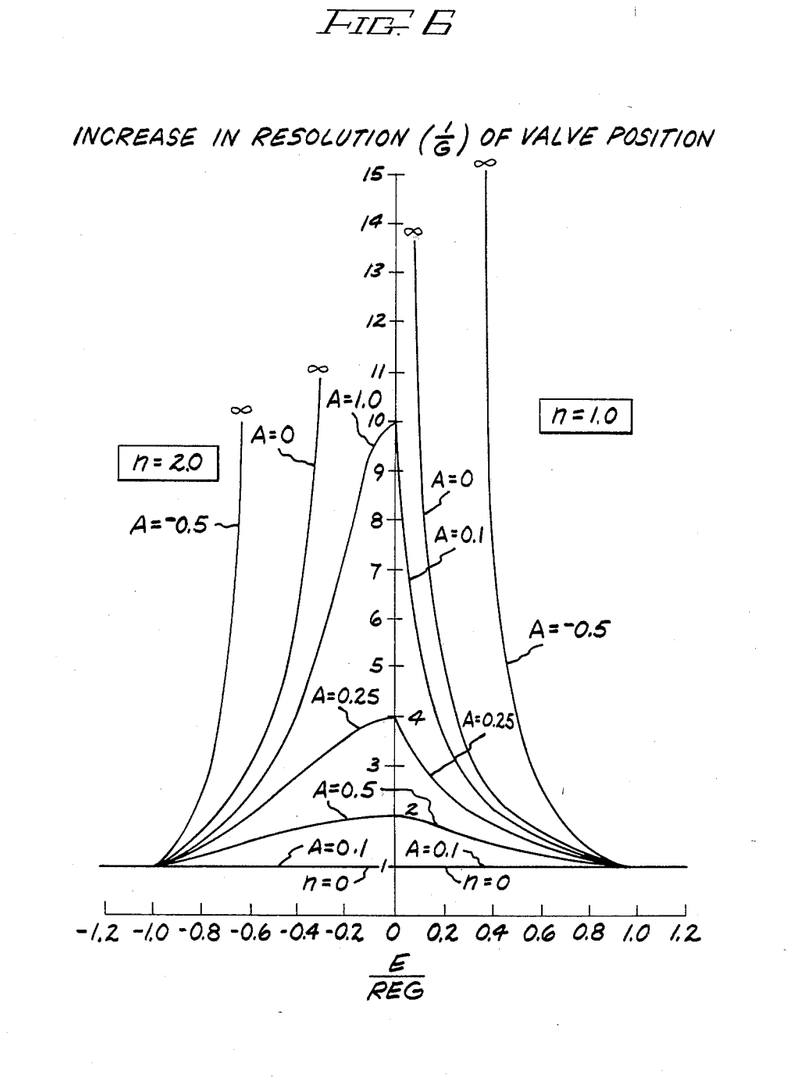
FIG. 6 graphically represents the increase in resolution, 1/G, of the valve position wherein the ordinate charts the reciprocal of the gain factor, 1/G, and the abscissa charts the normalized error signal divided by the regulation value, E/REG, and the right hand side of the graph shows the relationship when the non-linear gain characteristic function has $n=1$, the left hand side of the graph represents the non-linear gain characteristic function when $n=2$, wherein A varies selectively between $-0.5$ and $+1.0$ on both sides of the graph.

FIG. 6 illustrates graphically the increase in resolution, $1/G$, of valve position versus the ratio of the normalized error signal over the valve's regulation valve (E/REG). The right hand side of this graph plots the reciprocal of the gain factor, $1/G$, versus E/REG when n=1. The left hand side of the graph plots the reciprocal of the gain factor, for the nonlinear gain characteristic function when n=2. This graph illustrates in greater detail the ability of electronic operator 34 (which multiplies the amplified error signal by the gain factor G in FIG. 1) to reduce the overall gain of the control loop 10. It has been experimentally recommended that when n=1, A should equal +0.1; or when n=2, A should equal +0.1. The initial selection of these two sets of variables is based upon an analysis of the resolution of valve position versus E/REG. In other words, it is desirable to lower the overall gain of the entire loop for very small error signals without resorting to a deadband filter. When A=+0.1, the nonlinear gain characteristic function generator, as part of the electronic operator, provides positive corrective action for all errors, reduces the gain at low errors and allows faster response for progressively larger error signals.

Of course, other values of A near 0.1 may be advantageous. It is interesting to note that FIG. 6 illustrates four curves which approach infinity. Those curves correspond to the gain factor G approaching zero or being limited to zero. This aspect is clearly described in mathematical literature and corresponds to the nonlinear gain characteristic function being set as a type of dead band filter.

Figure 7:
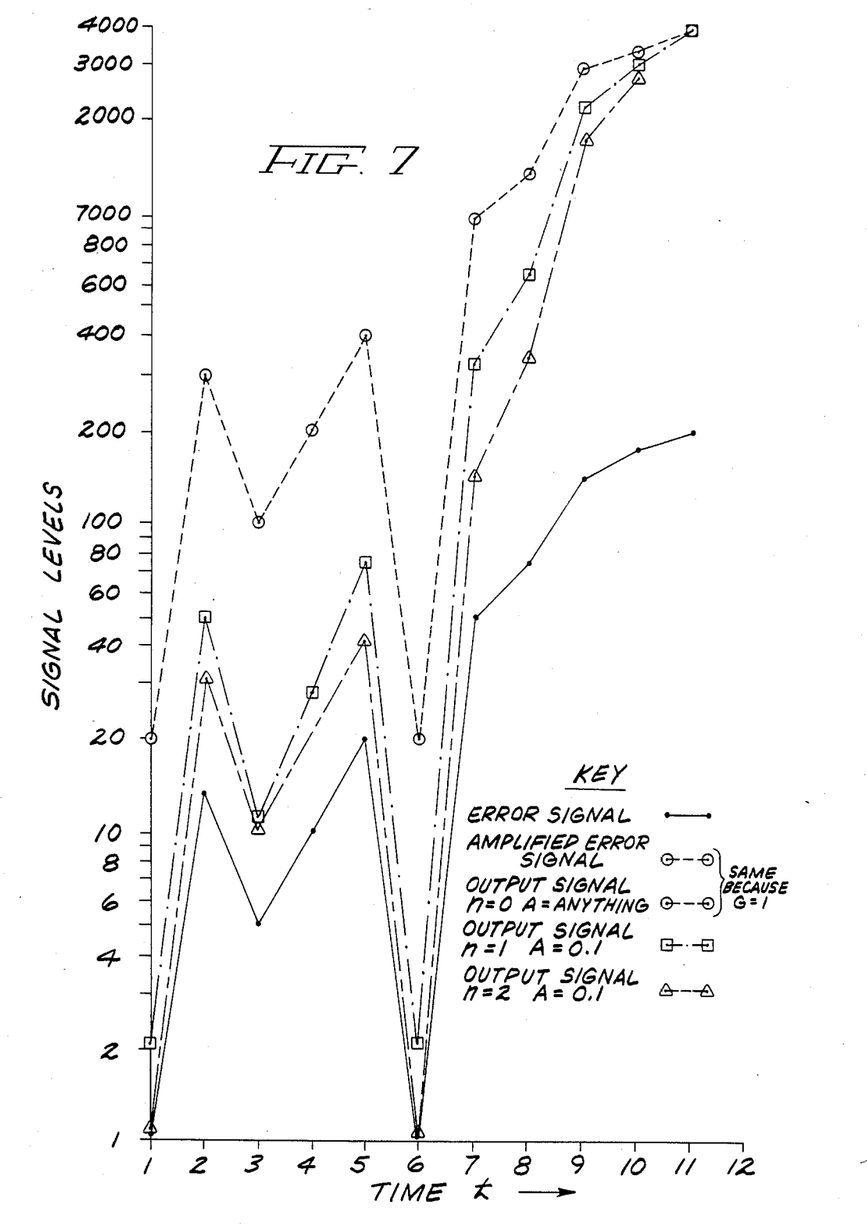
FIG. 7 graphically illustrates, on a logrithmic scale along its ordinate, the relationship of various signals versus arbitrarily established times, i.e., the error signal, the amplified error signal, and the output signal from the electronic operator when specific values of n and A are chosen for the function.

FIG. 7 graphically displays the various signal levels which result from a particular error signal. The signal levels vary from relatively small numbers up to approximately 4096 in the example under consideration herein, hence they are shown logrithmatically. The following table plots the points utilized for this graph.

| Time t | Error Signal | Output Signal n = 0 A = anything | Output Signal n = 1 A = +0.1 | Output Signal n = 2 A = +0.1 |
|---|---|---|---|---|
| 1 | 1 | 20 | 2.1 | 0.1 |
| 2 | 15 | 300 | 50 | 31.5 |
| 3 | 5 | 100 | 12.2 | 10.1 |
| 4 | 10 | 200 | 29 | 20.5 |
| 5 | 20 | 400 | 75 | 43 |
| 6 | 1 | 20 | 2.1 | 0.1 |
| 7 | 50 | 1000 | 320 | 154 |
| 8 | 75 | 1500 | 644 | 331 |
| 9 | 150 | 3000 | 2278 | 1748 |
| 10 | 180 | 3600 | 3208 | 2863 |
| 11 | 205 | 4096 | 4096 | 4096 |

At the outset, it should be noted that although the signals are plotted versus at times $t_1$ through $t_{11}$ in FIG. 7, the plotted points are representative of the signal levels and hence should not be confused with the actual digital signals which are illustrated in FIG. 2. The solid line in FIG. 7 represents the error signal levels at times $t_1$ through $t_{11}$. Initially, relatively low values are graphically illustrated as input into valve position control loop 10. A comparison of the error signal levels between times $t_1$ and $t_6$ and the amplified error signal levels, as represented by a dashed line, illustrates the amplification problem caused by a valve position control loop with a relatively low regulation value and high gain. Particularly focusing on times $t_2$ and times $t_5$, the disparity between amplified and unamplified signal levels is clearly shown.

The points plotted with squares about them and connected by a line-dot-lines are representative of the output signal of electronic operator 34 when the nonlinear gain characteristic function has n=1 and A=+0.1. In a similar fashion, the points surrounded by triangles and connected by line-dash-lines are the output signals for electronic operator 34 when the nonlinear gain characteristic function has n=2 and A=+0.1. An analysis of the various signal levels at time $t_5$, when the error signal is 20, shows that the electronic operator's output signal, when n=2, is approximately 40; the output signal, when n=1, is approximately 75; and the output signal, when n=0 or when there is no electronic operator 34, is 400.

A close analysis of this graph in conjunction with the monitoring of the amount of vibration or jitter in a particular electrohydraulic valve actuator, or subloop 50, will assist one in chosing the particular value of n and A to reduce the level of noise yet maintaining the speed of response for that valve position control loop at an acceptable rate. As an example, if noise is noted within the system at a signal level of 15 and the jitter in the subloop is intolerable at a 50 signal level, then the nonlinear gain chracteristic function may be set at n=1 and A= +0.1, since those function values provide a type of filter which lowers the small error signals (15) to approximately a 30 signal level, and hence the signals are lower than the "unacceptable jittery" 50 signal level.

FIG. 7 further graphically represents the speed of response when the error signal increases from a 50 signal level to a 205 signal level as illustrated between times $t_7$ and $t_{11}$. It should be noted at this point that when the error signal reaches the 200th level, or thereabouts, it is required that valve 14 must be opened. Hence, a resultant signal level from the electronic operator in the range of 4096 is noted when the error signal is at level 205, the former signal level corresponding to a fully opened digital signal command for valve 14 in the example herein. As can be determined by the graph in FIG. 7, the output signal when n=1 and A= +0.1 responds quicker to an increasing larger error signal than the output signal when n=2 and A= +0.1. Hence, if an operator required a faster responding valve position control loop, he would have to accept slightly larger amounts of digital jitter in his electrohydraulic valve actuator system.

As stated earlier, the output signal or resultant signal from the electronic operator is applied to the inputs of proportional controller 36 and derivative controller 38. The output of controller 36 and controller 38, in addition to the signal output from integral controller 32, are summed together by summer 40. The proportional controller, derivative controller, and integral controller are relatively well known in the art.

It should be understood that the introduction of microcomputer based control systems into large steam turbine controls includes the use of computers. In this sense, the various operations disclosed and herein relating to amplifying, generating, calculating and other functional descriptions can be accomplished by a computer relatively well known by those of ordinary skill in the art. For example, a microprocessor made by Intel, the Intel Model 8085, and associated hardware could be utilized for this application. However, it is possible to have other specific devices and hardware which provides for a nonlinear gain characteristic function generator as part of an electronic operator and which interacts with the valve position control loop as described herein. Since this invention is described functionally, a method for practicing this invention is also disclosed. The electronic operator utilizes a microprocessor to generate the gain factor G from the initially selected values of A and n and from the input values of E and REG. The setting up of the microprocessor to accomplish this task is known to those of ordinary skill in the art as is the interconnection of the various components described herein and illustrated in FIG. 1.

Although the specific example discussed herein relates to a bypass valve positioning control loop, those of ordinarily skill will recognize the value of this invention as it applies to all valve positioning control loops and other fast responding, high mechanical energy control loops. Also, each valve of the steam turbine system could have different nonlinear gain characteristic function settings for n and A within their control loops because each loop may have different levels of acceptable noise and/or acceptable amounts of jitter therein.

An apparatus constructed in accordance with the principles of the invention, and the method described herein, is useful in controlling steam turbine valves which have low regulation values and consequently high gains in their corresponding position control loops. The appended claims are intended to cover all the above modifications and other apparatus and methods which fall within the true spirit and scope of the present invention.

What is claimed is:

1. In combination with a steam turbine, wherein steam flow through a valve is controlled by a valve position control loop, the regulation of said valve being set relatively low thereby establishing a relatively high overall gain for said control loop, said control loop responding quickly to error signals and including an electrohydraulic valve actuator which directly effects the positioning of said valve, an adjustable gain controller as part of the digitized portion of said control loop which receives said error signals amplified by the reciprocal of the valve's regulation value, wherein the adjustable gain controller comprises:

an integral controller receiving the amplified error signals and integrating said amplified error signals over a preselected time period;

an electronic operator which includes means for initially selecting a value of A between −1.0 and +1.0 and means for initially selecting a value of n from the group consisting of 0, 1 and 2, said electronic operator generating a gain factor G, which is limited to positive values from the relationship expressed by $$G = A + (1-A)(E/REG)^n$$

wherein E is the normalized value of said error signal and the value of REG is the valve's regulation value, and said electronic operator multiplying said amplified error signals by said gain factor;

a proportional controller in parallel with a derivative controller, both receiving the electronic operator's output signal;

means for summing the outputs of said integral controller, said derivative controller and said proportional controller together; and means for adjusting both said value of A and said value of n to reduce the mechanical and hydraulic jitter in said electrohydraulic valve actuator which is caused by said digitized portion of said valve position control loop and yet maintain the relatively quick response of said control loop to said error signals.

2. A combination as recited in claim 1 above further including means for monitoring said mechanical and hydraulic jitter in said electrohydraulic valve actuator.

3. A combination as recited in claim 2 above wherein said error signal is the difference signal between a signal representative of the actual steam flow condition and a signal representative of the desired steam flow condition.

4. A combination as recited in claim 3 above wherein said integral controller is adjustable, said derivative controller is adjustable and said proportional controller is adjustable and said electronic operator utilizes a microprocessor to generate said gain factor from said values of A, n, E and REG.

5. A combination as recited in claim 4 above wherein the desired steam flow condition signal is digitally formated and the actual steam flow condition signal is digitally formated, said electrohydraulic valve actuator is supplied with pressurized hydraulic fluid through an associated hydraulic system and said electrohydraulic valve actuator responds to an analog electrical signal input thereto, and said valve position control loop includes:

a digital to analog converter which receives the summed output of said summing means and converts said summed output into an analog electrical signal;

means for applying said analog electrical signal to the electrical input of said electrohydraulic valve actuator; and wherein said monitoring means includes means for sensing the mechanical jitter on the mechanical connection between said electrohydraulic valve actuator and said valve stem, means for sensing the mechanical jitter within and on said electrohydraulic valve actuator, means for sensing the hydraulic jitter within said electrohydraulic valve actuator and in its associated hydraulic system, and said monitoring means includes means for displaying the respective output signals from said sensors.

6. A method of reducing mechanical and hydraulic jitter in an electrohydraulic valve actuator which is part of a valve position control loop in combination with a steam turbine, said valve actuator controlling the flow of steam through said valve, the valve's regulation being set relatively low and said control loop responding quickly to steam flow condition error signals, said error signals being amplified by the reciprocal of the valve's regulation value thereby establishing a relatively high gain for said control loop, the method of reducing the jitter caused by a digitized portion of said control loop comprising the steps of:

(a) initially selecting a value of A between $-1.0$ and $+1.0$;

(b) initially selecting a value of n from the group consisting of 0, 1 and 2;

(c) calculating a gain factor G from the relationship expressed by $$G = A + (1-A)(E/REG)^n$$

wherein G is limited to positive values, E is the normalized value of said error signal and the value of REG is said valve's regulation value;

(d) integrating the amplified error signals over a preselected time period;

(e) multiplying said amplified error signals by said gain factor to produce resultant signals;

(f) obtaining the derivative of said resultant signals with a preselected gain multiplier;

(g) multiplying said resultant signals by a preselected constant;

(h) summing the integrated, amplified error signal, the derivative of said resultant signal and the proportional output resultant signal together;

(i) applying the summed signal to said electrohydraulic valve actuator;

(j) monitoring the mechanical and hydraulic jitter of said electrohydraulic valve actuator; and (k) repeating all the above steps with different values of A and different values of n until the jitter is reduced to an acceptable level and said valve responds to an error signal by establishing the desired steam flow condition within an acceptable period of time.

7. A method as recited in claim 6 above wherein said error signal is a digitized difference signal; each step of said method is performed digitally except steps i, j and k; and said electrohydraulic valve actuator responds to an analog electrical signal input thereto, said method further comprising the step of:

converting the digitized summed signal into an analog electrical signal before step i.

8. In combination with a computer-based control system for a steam turbine, wherein a steam valve is controlled directly by a valve positioning subloop which responds to analog electrical signals input thereto, and said computer-based control system generates digital error signals which are the difference between the actual steam flow condition through said valve and the desired steam flow condition through said valve, an adjustable gain controller as part of the digitized portion of a valve position control loop tied to said positioning subloop and said control system, said controller comprising:

an integral controller receiving said error signals and integrating said error signals over a preselected time period;

an electronic operator which includes means for initially selecting a value of A between $-1.0$ and $+1.0$ and means for initially selecting a value of n from the group consisting of 0, 1 and 2, said electronic operator generating a gain factor G from the relatioship expressed by $$G = A + (1-A)(E/REG)^n$$

wherein G is limited to positive values, E is the normalized value of said error signal and the value of REG is the valve's regulation value, and said electronic operator multiplying said amplified error signals by said gain factor;

a proportional controller in parallel with a derivative controller, both receiving the electronic operator's output signals;

means for summing the outputs of said integral controller, said derivative controller and said proportional controller together;

means for converting said summed output into an analog electrical signal and inputing said analog signal into said positioning subloop; and means for adjusting both said value of A and said value of n to reduce the mechanical and hydraulic jitter in said positioning subloop which is caused by said digitized portion of said control loop and yet maintaing the relatively quick response of said control loop to said error signals.

* * * * *